(12) United States Patent
Boeker et al.

(10) Patent No.: US 11,906,954 B2
(45) Date of Patent: Feb. 20, 2024

(54) METHOD FOR PROVIDING AUTOMATED ASSISTANCE WITH REPAIRING A MOTOR-DRIVEN TOOL AND SYSTEM FOR PROVIDING AUTOMATED ASSISTANCE WITH REPAIRING A MOTOR-DRIVEN TOOL

(71) Applicant: Andreas Stihl AG & Co. KG, Waiblingen (DE)

(72) Inventors: Robert Boeker, Waiblingen (DE); Martin Bobert, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 416 days.

(21) Appl. No.: 17/175,352

(22) Filed: Feb. 12, 2021

(65) Prior Publication Data
US 2021/0256404 A1  Aug. 19, 2021

(30) Foreign Application Priority Data

Feb. 13, 2020  (EP) ..................... 20157265

(51) Int. Cl.
*G05B 23/02* (2006.01)
*B25F 5/00* (2006.01)

(52) U.S. Cl.
CPC ............ *G05B 23/0205* (2013.01); *B25F 5/00* (2013.01)

(58) Field of Classification Search
CPC ....... G05B 23/0205; B25F 5/00; G06Q 10/20; F02B 63/02; G01W 1/02
See application file for complete search history.

(56) References Cited

U.S. PATENT DOCUMENTS 6,778,893 B2 * 8/2004 Murakami ............... G08G 1/20
701/34.2
10,808,632 B2 10/2020 Eberle et al.
2001/0002450 A1 * 5/2001 Mizutani ............. B60R 16/0234
709/219
(Continued)

FOREIGN PATENT DOCUMENTS

DE  10 2015 109 203 A1  12/2015
EP       3 424 296 A1   1/2019
(Continued)

OTHER PUBLICATIONS

German-language Extended European Search Report issued in European Application No. 20157265.8 dated Apr. 20, 2020 with partial English translation (nine (9) pages).
(Continued)

*Primary Examiner* — Christopher E. Everett
(74) *Attorney, Agent, or Firm* — Crowell & Moring LLP

(57) ABSTRACT

A method for providing automated assistance with repairing a motor-driven tool, includes the steps of: ascertaining at least one boundary operating condition of the tool, wherein the tool has previously not functioned properly under this boundary operating condition; determining a set of possible fault symptoms, possible causes of faults of the tool, possible repair action instructions, and/or possible replacement parts for the tool, on the basis of the ascertained boundary operating condition; and outputting the determined set of possible fault symptoms, possible causes of faults, possible repair action instructions, and/or possible replacement parts.

15 Claims, 4 Drawing Sheets

(56) References Cited

U.S. PATENT DOCUMENTS

| | | | |
|---|---|---|---|
| 2002/0067289 A1* | 6/2002 | Smith | G08G 1/0962 340/905 |
| 2005/0137762 A1* | 6/2005 | Rother | G01M 17/00 701/31.4 |
| 2012/0110985 A1* | 5/2012 | McCombs | F02M 26/06 60/287 |
| 2012/0323531 A1* | 12/2012 | Pascu | F01D 17/02 702/184 |
| 2014/0262130 A1* | 9/2014 | Yenni | F24F 11/89 165/11.1 |
| 2015/0039269 A1* | 2/2015 | Mejegard | H04W 4/80 702/182 |
| 2015/0371455 A1 | 12/2015 | Abdel-Rahman et al. | |
| 2016/0173816 A1 | 6/2016 | Huenerfauth et al. | |
| 2017/0205791 A1 | 7/2017 | Yang et al. | |
| 2019/0010880 A1* | 1/2019 | Eberle | F02D 41/3005 |
| 2019/0011418 A1 | 1/2019 | Eppinger et al. | |
| 2021/0054601 A1 | 2/2021 | Bramberger et al. | |

FOREIGN PATENT DOCUMENTS

| | | |
|---|---|---|
| EP | 3 424 301 A1 | 1/2019 |
| WO | WO 02/13015 A1 | 2/2002 |
| WO | WO 2019/211393 A1 | 11/2019 |

OTHER PUBLICATIONS

German-language European Office Action issued in European Application No. 20 157 265.8 dated Mar. 9, 2023 (eight (8) pages).

* cited by examiner

METHOD FOR PROVIDING AUTOMATED ASSISTANCE WITH REPAIRING A MOTOR-DRIVEN TOOL AND SYSTEM FOR PROVIDING AUTOMATED ASSISTANCE WITH REPAIRING A MOTOR-DRIVEN TOOL

CROSS REFERENCE TO RELATED APPLICATION

This application claims priority under 35 U.S.C. § 119 from European Patent Application No. 20157265.8, filed Feb. 13, 2020, the entire disclosure of which is herein expressly incorporated by reference.

BACKGROUND AND SUMMARY OF THE INVENTION

The invention relates to a method for providing automated assistance with repairing a motor-driven tool and to a system for providing automated assistance with repairing a motor-driven tool.

The invention is based on the problem of making available a method for providing automated assistance with repairing a motor-driven tool and a system for providing automated assistance with repairing a motor-driven tool.

The invention solves this problem by providing a method and/or a system according to the independent claims. Advantageous developments and/or refinements of the invention are described in the dependent claims.

The method according to the invention is designed or configured to provide automated assistance with repairing, in particular when accepting a repair of, a motor-driven tool. The method comprises the steps of: a) ascertaining, in particular ascertaining in an automated fashion, in particular detecting and/or receiving, at least one boundary operating condition, in particular a value of the boundary operating condition, of the tool, wherein the tool has previously not functioned, in particular has no longer functioned, properly, or even has not functioned, in particular has no longer functioned, under this boundary operating condition; b) determining, in particular determining in an automated fashion, a set of possible or probable fault symptoms and/or possible or probable causes of faults of the tool and/or possible or probable repair action instructions and/or possible or probable replacement parts for the tool on the basis of the ascertained boundary operating condition; c) outputting, in particular outputting in an automated fashion, the determined set of possible fault symptoms and/or possible causes of faults and/or possible repair action instructions and/or possible replacement parts, in particular to or for a user and/or a repairer of the tool.

This, in particular the ascertaining of the boundary operating condition, permits the indirect determination of the set of possible fault symptoms and/or possible causes of faults and/or possible repair action instructions and/or possible replacement parts. Additionally or alternatively, this, in particular the outputting of the determined set of possible fault symptoms and/or possible causes of faults and/or possible repair action instructions and/or possible replacement parts, permits the repair to be executed quickly and therefore cost-effectively or even to be executed at all, in particular by the repairer.

In particular, the tool can be a hand-guided, in particular handheld, tool. In particular, hand-guided, in particular handheld, tool can mean that the tool has a mass of at maximum 50 kilograms (kg), in particular at maximum 20 kg, in particular at maximum 10 kg, in particular at maximum 5 kg and/or at minimum 1 kg, in particular at minimum 2 kg. Additionally or alternatively, the tool can be a garden tool, forestry tool and/or construction tool.

The ascertaining process can be carried out by means of an ascertaining device. In particular, the ascertaining device can be embodied separately from the tool. In other words, the ascertaining device does not need to be or may not be a component of the tool.

The boundary operating condition can be such that the determination of the set of possible fault symptoms and/or possible causes of faults and/or possible repair action instructions and/or possible replacement parts can be made possible. In other words, the boundary operating condition can be relevant for the inproper functioning of the tool. Additionally or alternatively, at least one further boundary operating condition, which is not relevant or irrelevant, in particular, for the inproper functioning of the tool, can be ascertained.

On the basis of the ascertained boundary operating condition, in particular the ascertained value of the boundary operating condition, the set of possible fault symptoms and/or possible causes of faults of the tool and/or possible repair action instructions and/or possible replacement parts for the tool can be determined and on the basis of another ascertained boundary operating condition, in particular another ascertained value of the boundary operating condition, another set of other possible fault symptoms and/or other possible causes of faults of the tool and/or other possible repair action instructions and/or other possible replacement parts for the tool can be determined.

The set can have at least, in particular only, one, in particular single, possible fault symptom and/or at least, in particular only, one, in particular one, possible cause of a fault and/or at least, in particular only, one, in particular single, possible repair action instruction and/or at least, in particular only, one, in particular single, possible replacement part. Additionally or alternatively, a further set of improbable fault symptoms and/or improbable causes of faults of the tool and/or improbable repair action instructions and/or improbable replacement parts for the tool, in particular which have not been determined on the basis of the ascertained boundary operating condition, may be output, in particular in such a way that it is possible to differentiate between the set and the further set, in particular by the user and/or the repairer, such as e.g. by means of prioritization.

The outputting can comprise acoustic and/or optical outputting, in particular displaying.

The step b) can be executed chronologically after the step a). Additionally or alternatively, the step c) can be executed chronologically after the step b).

In one development of the invention, the tool does not comprise a, in particular electric, fault sensor and/or a, in particular electric, fault memory. This makes it possible for the tool to be embodied simply and therefore cost-effectively.

In one development of the invention, the set of possible fault symptoms can be selected by a user. The method comprises the steps of: d) selecting, in particular only, one, in particular single, fault symptom from the determined, in particular and output, set which can be selected by a user, of possible fault symptoms, in particular by the user and/or the repairer; e) determining, in particular determining in an automated fashion, a set of possible or probable causes of faults of the tool and/or possible or probable repair action instructions and/or possible or probable replacement parts for the tool on the basis of the selected fault symptom; f)

outputting, in particular outputting in an automated fashion, the determined set of possible causes of faults and/or possible repair action instructions and/or possible replacement parts, in particular to or for the user and/or the repairer. This permits the repair to be executed particularly quickly and therefore particularly cost-effectively. In particular, on the basis of the selected fault symptom it is possible to determine the set of possible causes of faults of the tool and/or possible repair action instructions and/or possible replacement parts for the tool, and on the basis of another selected fault symptom it is possible to determine another set of other possible causes of faults of the tool and/or other possible repair action instructions and/or other possible replacement parts for the tool. Additionally or alternatively, the set can have at least, in particular only, one, in particular one, possible cause of a fault and/or at least, in particularly only, one, in particular single, possible repair action instruction and/or at least, in particular only, one, in particular single, possible replacement part. It is also additionally or alternatively possible for a further set of improbable causes of faults of the tool and/or improbable repair action instructions and/or improbable replacement parts for the tool, in particular which have not been determined on the basis of the selected fault symbol, to be output, in particular in such a way that it is possible to differentiate between the set and the further set, in particular by the user and/or the repairer, such as e.g. by means of prioritization. It is also additionally or alternatively possible for the outputting to comprise acoustic and/or optical outputting, in particular displaying. It is also additionally or alternatively possible for the step d) to be executed chronologically after the step c). It is also additionally or alternatively possible for the step e) to be executed chronologically after the step d). It is also additionally or alternatively possible for the step f) to be executed chronologically after the step e).

In one development of the invention, the boundary operating condition comprises a meteorological characteristic variable, in particular an air pressure value, an air humidity value, a precipitation value and/or a temperature value, and/or an altitude value and/or a position of an operating environment of the tool. In particular, the altitude can be above sea level. This permits the determination of the set of possible fault symptoms and/or possible causes of faults of the tool and/or possible repair action instructions and/or possible replacement parts for the tool particularly well. In other words, the boundary operating condition of this type can be particularly relevant for the inproper functioning of the tool.

In one refinement of the invention, the step a) comprises: ascertaining, in particular ascertaining in an automated fashion, in particular detecting, an altitude, in particular a value of the altitude, and/or a position, in particular a value of the position, of an operating environment of the tool, and ascertaining, in particular ascertaining in an automated fashion, in particular receiving, the meteorological characteristic variable on the basis of the ascertained altitude and/or the ascertained position. This permits the meteorological characteristic variable to be ascertained indirectly.

In one development of the invention, the tool comprises an internal-combustion-engine drive system. The internal-combustion-engine drive system has previously not functioned properly under this boundary operating condition. The set is of possible fault symptoms and/or possible causes of faults of the internal-combustion-engine drive system and/or possible repair action instructions and/or possible replacement parts for the internal-combustion-engine drive system. In particular, the meteorological characteristic variable can be particularly relevant for the inproper functioning of the internal-combustion-engine drive system. Additionally or alternatively, the tool can have a processing tool, and the internal-combustion-engine drive system can be designed to drive the processing tool.

In one refinement of the invention, the internal-combustion-engine drive system comprises a mixture controller, in particular a carburettor, and/or a spark plug and/or a valve, in particular a fuel inlet valve, in particular a fuel injection valve, and/or a clutch.

In one development of the invention, the tool is a saw, a pole-mounted pruner, a brush cutter, hedge shears, a hedge cutter, a blower, a leaf blower, branch shears, an angle grinder, a sweeping implement, a sweeping roller, a sweeping brush, a lawnmower, a verticutter, a grass trimmer, a chopper, a stone cutter, a high pressure cleaner or a spraying device and/or sprayer.

In one development of the invention, the method comprises the step of: ascertaining, in particular ascertaining in an automated fashion, in particular detecting and/or receiving, a type of the tool. The method comprises: determining, in particular automatically determining, the set of possible fault symptoms and/or possible causes of faults and/or possible repair action instructions and/or possible replacement parts on the basis of the ascertained type. This makes it possible to avoid determining, in particular and outputting, non-relevant, in particular impossible, fault symptoms and/or non-relevant, in particular impossible, causes of faults and/or non-relevant, in particular impossible, repair action instructions and/or non-relevant, in particular impossible, replacement parts for the ascertained type. In particular, the type of the tool can be from a set of different types of motor-driven tools.

In one refinement of the invention, the ascertaining of the type of tool comprises: selecting, in particular selecting in an automated fashion, in particular only, the, in particular single, type of tool from a set of different types of motor-driven tools, in particular by the user and/or the repairer. This permits a high level of user-friendliness and/or repairer-friendliness.

In one development, in particular a refinement, of the invention, the determination comprises: selecting, in particular selecting in an automated fashion, the set of possible fault symptoms from a set of different fault symptoms, wherein the fault symptoms are each assigned at least one boundary operating condition, in particular a value of the boundary operating condition, from a set of different boundary operating conditions, in particular different values of the boundary operating condition, in particular and at least one type of a tool from a set of different types of tools, insofar as they are present. Additionally or alternatively, the determination comprises: selecting, in particular selecting in an automated fashion, the set of possible causes of faults and/or possible repair action instructions and/or possible replacement parts from a set of different causes of faults and/or different repair action instructions and/or different replacement parts, wherein the causes of faults and/or the repair action instructions and/or the replacement parts are each assigned at least one boundary operating condition, in particular a value of the boundary operating condition, from a set of different boundary operating conditions, in particular different values of the boundary operating condition, and/or at least one fault symptom from a set of different fault symptoms, insofar as they are present, in particular and at least one type of a tool from a set of different types of tools, insofar as they are present. This permits the determination of the set of possible fault symptoms and/or possible causes of faults and/or possible repair action instructions and/or possible replacement parts on the basis of the ascertained boundary operating condition and/or the selected fault symptom, in particular and the ascertained type.

In one refinement of the invention, the method comprises the steps of: ascertaining an actual fault symptom and/or an actual cause of a fault of the tool and/or an actual repair action instruction and/or an actual replacement part for the tool, in particular by the user and/or the repairer, in particular at the same time as and/or chronologically after the repair; assigning, in particular assigning in an automated fashion, the at least one boundary operating condition to the ascertained actual fault symptom and/or the at least one boundary operating condition and/or the, in particular selected and/or actual, fault symptom, insofar as one is present, to the ascertained actual cause of a fault and/or to the ascertained actual repair action instruction and/or to the ascertained actual replacement part for a subsequent execution of the method. This permits the method to be refined, in particular gradually. In particular, the ascertaining of the actual fault symptom and/or of the actual cause of a fault and/or of the actual repair action instruction and/or of the actual replacement part can comprise confirming or changing the determined, in particular and output, set of possible fault symptoms and/or possible causes of faults and/or possible repair action instructions and/or possible replacement parts.

The method according to the invention, in particular as described above, is designed or configured to provide automated assistance with repairing, in particular when accepting a repair of, a, in particular the, motor-driven tool. The method comprises the steps of: ascertaining, in particular ascertaining in an automated fashion, in particular receiving, at least one operating condition, in particular a value of the operating condition, in particular an operating rotational speed frequency distribution, in particular values of the operating rotational speed frequency distribution, of the tool, in particular until the tool has not functioned, in particular has no longer functioned, properly or even has not functioned, in particular has no longer functioned; determining, in particular determining in an automated fashion, a, in particular the, set of possible or probable fault symptoms and/or possible or probable causes of faults of the tool and/or possible or probable repair action instructions and/or possible or probable replacement parts for the tool on the basis of the ascertained operating condition; outputting, in particular outputting in an automated fashion, the determined set of possible fault symptoms and/or possible causes of faults and/or possible repair action instructions and/or possible replacement parts, in particular to or for the user and/or the repairer.

This, in particular the ascertaining of the operating condition, permits the indirect determination of the set of possible fault symptoms and/or possible causes of faults and/or possible repair action instructions and/or possible replacement parts. Additionally or alternatively, this, in particular the outputting of the determined set of possible fault symptoms and/or possible causes of faults and/or possible repair action instructions and/or possible replacement parts, permits the repair to be executed quickly and therefore cost-effectively or even to be executed at all, in particular by the repairer.

In particular, the at least one operating condition does not need to be or may not be a fault. Additionally or alternatively, the at least one boundary operating condition and the at least one operating condition can be different, in particular of different types.

The operating condition can be such that the determination of the set of possible fault symptoms and/or possible causes of faults and/or possible repair action instructions and/or possible replacement parts can be made possible. In other words, the operating condition can be relevant for the inproper functioning of the tool. Additionally or alternatively, at least one further operating condition, which is not relevant or irrelevant, in particular, for the inproper functioning of the tool, can be ascertained.

On the basis of the ascertained operating condition, in particular the ascertained value of the operating condition, the set of possible fault symptoms and/or possible causes of faults of the tool and/or possible repair action instructions and/or possible replacement parts for the tool can be determined, and on the basis of another ascertained operating condition, in particular another ascertained value of the operating condition, another set of other possible fault symptoms and/or other possible causes of faults of the tool and/or other possible repair action instructions and/or other possible replacement parts for the tool can be determined.

The set can have at least, in particular only, one, in particular single, possible fault symptom and/or at least, in particular only, one, in particular one, possible cause of a fault and/or at least, in particular only, one, in particular single, possible repair action instruction and/or at least, in particular only, one, in particular single, possible replacement part. Additionally or alternatively, a further set of improbable fault symptoms and/or improbable causes of faults of the tool and/or improbable repair action instructions and/or improbable replacement parts for the tool, in particular, which have not been determined on the basis of the ascertained boundary operating condition, may be output, in particular in such a way that it is possible to differentiate between the set and the further set, in particular by the user and/or the repairer, such as e.g. by means of prioritization.

The outputting can comprise acoustic and/or optical outputting, in particular displaying.

The determining process can be executed chronologically after the ascertaining process. Additionally or alternatively, the outputting process can be executed chronologically after the determining process.

The system according to the invention, in particular electric system, is designed or configured to provide automated assistance with repairing, in particular when accepting a repair of, a, in particular the, motor-driven tool, in particular for executing the method as described above. The system comprises an, in particular electric, ascertaining device, a, in particular electric, determining device and an, in particular electric, output device. The ascertaining device is designed or configured to ascertain, in particular in an automated fashion, at least one, in particular the at least one, boundary operating condition of the tool, wherein the tool has previously not functioned properly under this boundary operating condition. The determining device is designed or configured to determine, in particular an automated fashion, a, in particular the, set of possible fault symptoms and/or possible causes of faults of the tool and/or possible repair action instructions and/or possible replacement parts for the tool on the basis of the ascertained boundary operating condition. The output device is designed or configured to output, in particular in an automated fashion, the determined set of possible fault symptoms and/or possible causes of faults and/or possible action instructions and/or possible replacement parts, in particular to or for the user and/or the repairer.

In particular, the system can have a mobile, in particular portable or handheld, apparatus, wherein the apparatus can have the ascertaining device, the determining device and/or the output device. In particular, the mobile apparatus can have, in particular can be, a smartphone and/or a smartwatch. Additionally or alternatively, the mobile apparatus can be embodied separately from the tool. In other words, the mobile apparatus does not need to be or may not be a component of the tool.

In one development of the invention, the system comprises the tool.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
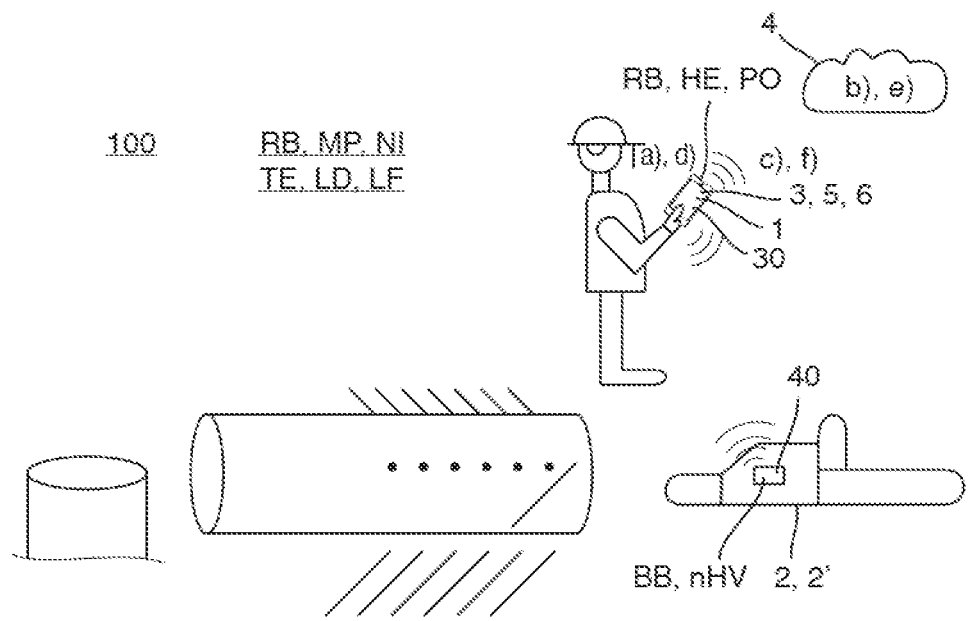
FIG. 1 shows a schematic view of a method according to the invention and of a system according to the invention.

FIGS. 1 to 4, 6 and 7 show a system 1 and a method for providing automated assistance with repairing a motor-driven tool 2. The system 1 has an ascertaining device 3, a determining device 4 and an output device 5, two output devices 5 in the exemplary embodiment shown. The ascertaining device 3 is designed to ascertain at least one boundary operating condition RB of the tool 2, wherein the tool 2 has previously not functioned properly under this boundary operating condition RB. The determining device 4 is designed to determine a set of possible fault symptoms mFS and/or possible causes of faults mFU of the tool 2 and/or possible repair action instructions mRA and/or possible replacement parts mET for the tool 2 on the basis of the ascertained boundary operating condition RB. The output device 5 is designed to output the determined set of possible fault symptoms mFS and/or possible causes of faults mFU and/or possible repair action instructions mRA and/or possible replacement parts mET.

Figure 2:
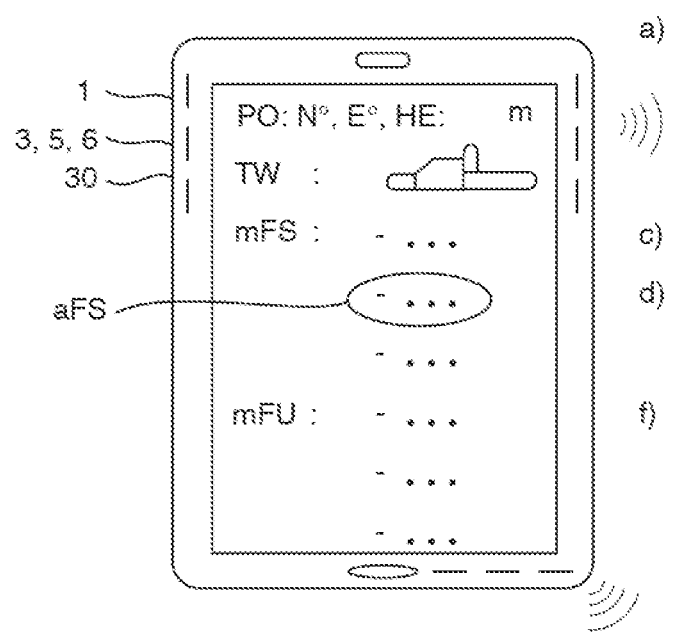
FIG. 2 shows a schematic view of part of the method in FIG. 1 and of an ascertaining device and an output device of the system in FIG. 1.
Figure 3:
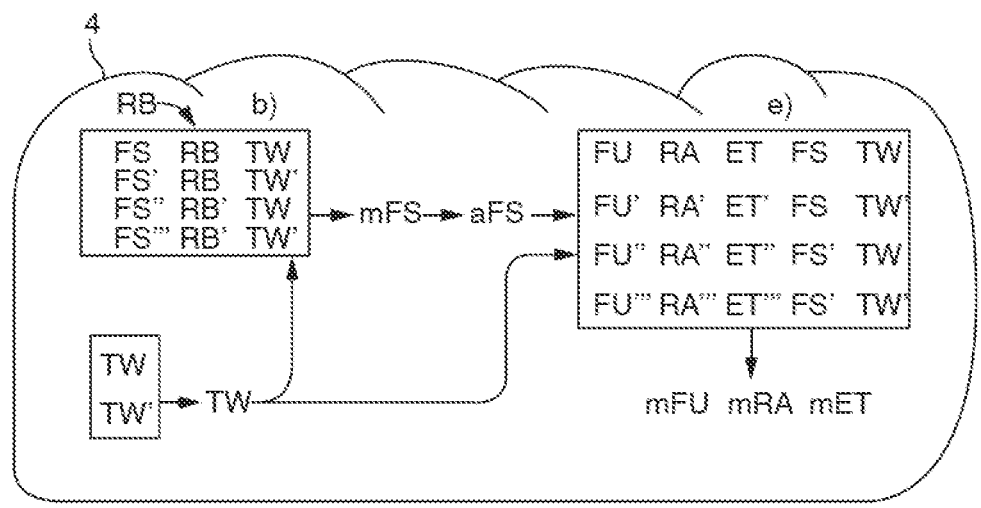
FIG. 3 shows a further schematic view of part of the method in FIG. 1 and of a determining device of the system in FIG. 1.
Figure 7:
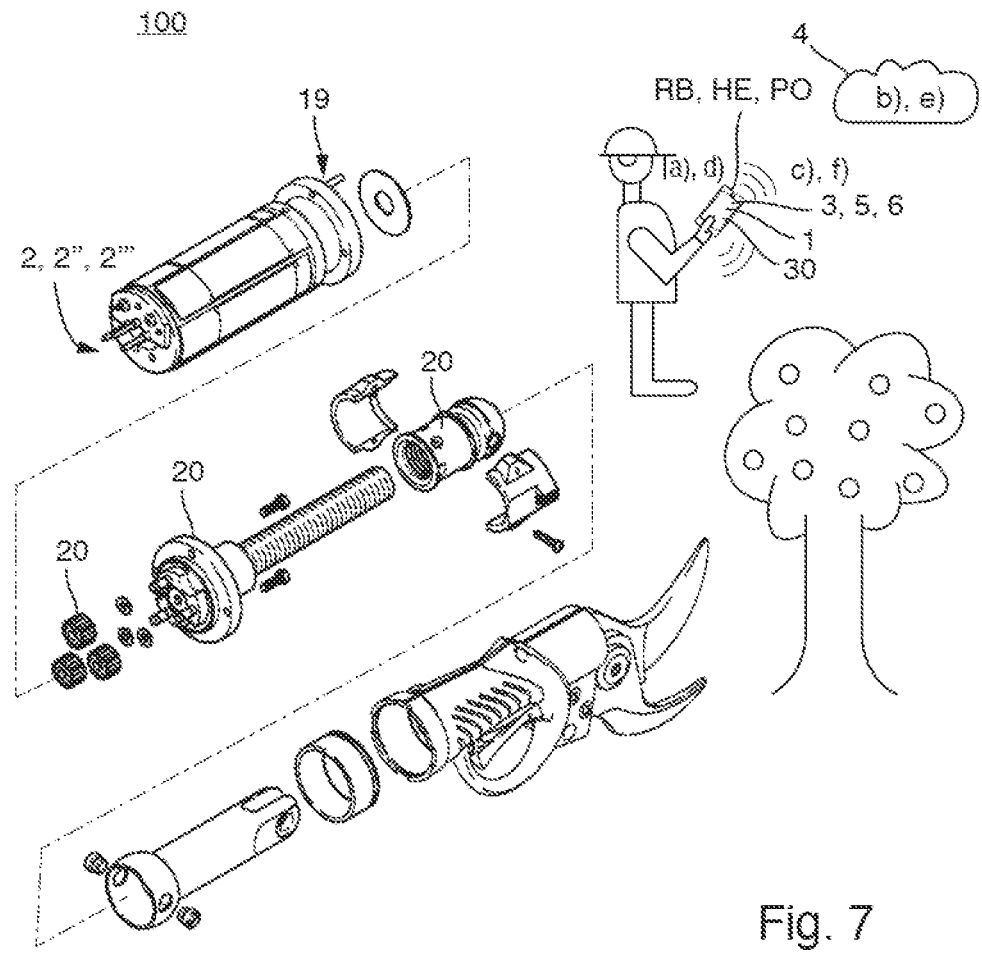
FIG. 7 shows a schematic exploded view of a further motor-driven tool of the system in FIG. 1.

The method comprises the steps of: a) ascertaining the at least one boundary operating condition RB of the tool 2, wherein the tool 2 has previously not functioned properly under this boundary operating condition RB, in particular by means of the ascertaining device 3, as shown in FIGS. 1, 2 and 7; b) determining the set of possible fault symptoms mFS and/or possible causes of faults mFU of the tool 2 and/or possible repair action instructions mRA and/or possible replacement parts mET for the tool 2 on the basis of the ascertained boundary operating condition RB, in particular by means of the determining device 4, as shown in FIGS. 1, 3 and 7; c) outputting the determined set of possible fault symptoms mFS and/or possible causes of faults mFU and/or possible repair action instructions mRA and/or possible replacement parts mET, in particular by means of the output device 5, in particular to or for a user and/or a repairer of the tool 2, as shown in FIGS. 1, 2, 4 and 7.

Figure 5:
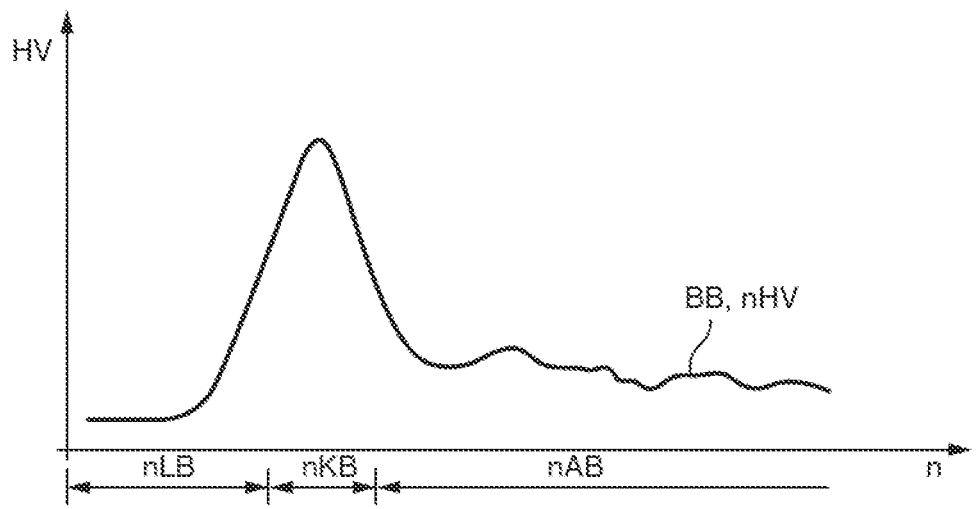
FIG. 5 shows a schematic view of an operating condition of a motor-driven tool of the system in FIG. 1.
Figure 6:
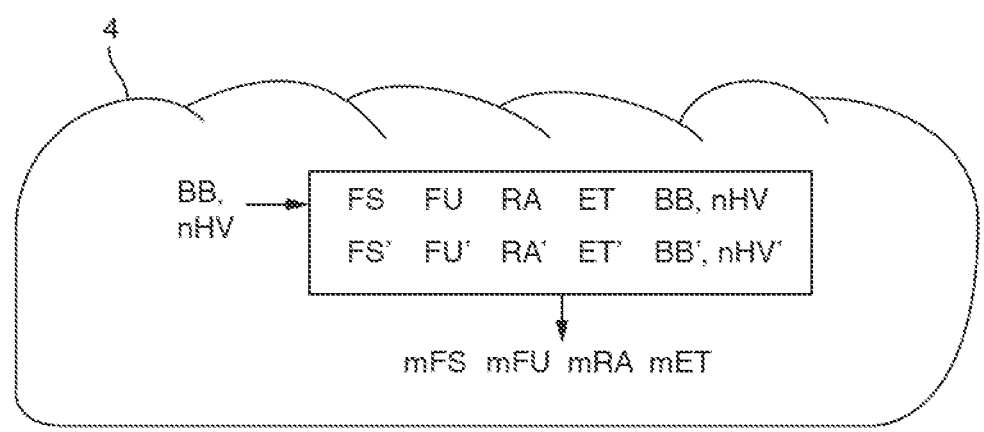
FIG. 6 shows yet a further schematic view of part of the method in FIG. 1 and of the determining device of the system in FIG. 1.

Additionally or alternatively, the method comprises the steps of: ascertaining at least one operating condition BB, an operating rotational speed frequency distribution nHV in the exemplary embodiment shown, as shown in FIG. 5, of the tool 2, in particular until the tool 2 has not functioned properly, in particular by means of the ascertaining device 3, as shown in FIGS. 1 and 2; determining the set of possible fault symptoms mFS and/or possible causes of faults mFU of the tool 2 and/or possible repair action instructions mRA and/or possible replacement parts mET for the tool 2 on the basis of the ascertained operating condition BB, in particular by means of the determining device 4, as shown in FIGS. 1 and 6; outputting the determined set of possible fault symptoms mFS and/or possible causes of faults mFU and/or possible repair action instructions mRA and/or possible replacement parts mET, in particular by means of the output device 5.

In the exemplary embodiment shown, the system 1 has a mobile apparatus 30, in particular in the form of a smartphone. The mobile apparatus 30 has the ascertaining device 3 and one of the output devices 5, in particular in the form of a display.

Figure 4:
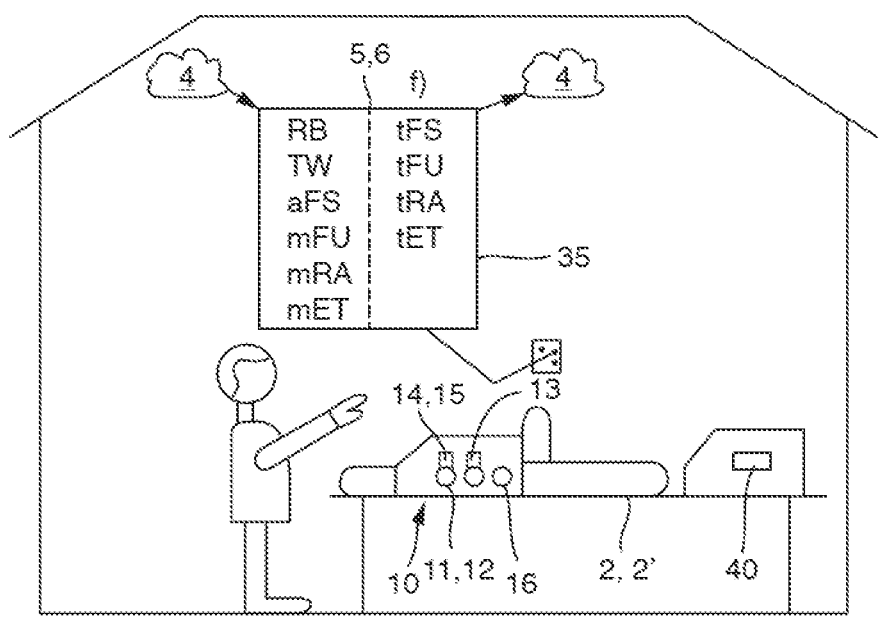
FIG. 4 shows yet a further schematic view of part of the method in FIG. 1 and of a further output device of the system in FIG. 1.

Furthermore, the system 1 has a stationary apparatus 35, in particular in the form of a computer, in particular in a workshop, as shown in FIG. 4. The stationary apparatus 35 has one of the output devices 5, in particular in the form of a display.

Moreover, the determining device 4 is in the form of a cloud server.

The ascertaining device 3 and the determining device 4 are also designed to transmit, in particular in a wireless fashion, the ascertained boundary operating condition RB and/or the ascertained operating condition BB, in particular transmit it.

In addition, the determining device 4 and the output device 5 are designed to transmit, in particular in a wireless fashion, the determined set of possible fault symptoms mFS and/or possible causes of faults mFU and/or possible repair action instructions mRA and/or possible replacement parts mET, in particular transmit said set.

Furthermore, the system 1 has the tool 2.

In the exemplary embodiment shown, the tool 2 has an operating condition memory 40 for storing the at least one operating condition BB, as shown in FIGS. 1 and 4. The ascertaining device 3 and the operating condition memory 40 are designed to transmit, in particular in a wireless fashion, the operating condition BB, in particular transmit it.

In detail, the tool 2 does not have a fault sensor and/or does not have a fault memory.

In FIGS. 1 to 6, the tool 2 is a saw 2'.

In FIG. 7, the tool 2 is branch shears 2".

Moreover, in FIG. 7 the tool 2 has an electric motor drive system 19. The electric motor drive system 19 has previously not functioned properly under this boundary operating condition RB. The set is of possible fault symptoms mFS and/or possible causes of faults mFU of the electric motor drive system 19 and/or possible repair action instructions mRA and/or possible replacement parts mET for the electric motor drive system 19.

In detail, the electric motor drive system 19 has a gear mechanism 20, in particular a ball screw, a recirculating ball nut and/or a pinion assembly.

In particular, in FIG. 7 the tool 2 is a battery tool 2'''.

In FIGS. 1 to 6, the tool 2 also has an internal-combustion-engine drive system 10. The internal-combustion-engine drive system 10 has previously not functioned properly under this boundary operating condition RB. The set is of possible fault symptoms mFS and/or possible causes of faults mFU of the internal-combustion-engine drive system 10 and/or possible repair action instructions mRA and/or possible replacement parts mET for the internal-combustion-engine drive system 10.

In detail, the internal-combustion-engine drive system 10 has a mixture controller 11, in particular a carburettor 12, and/or a spark plug 13 and/or a valve 14, in particular a fuel inlet valve 15 and/or a clutch 16.

In addition, the method comprises the step of: ascertaining a type TW of the tool 2, in particular by means of the ascertaining device 3. The method comprises: determining the set of possible fault symptoms mFS and/or possible causes of faults mFU and/or possible repair action instructions mRA and/or possible replacement parts mET on the basis of the ascertained type TW, in particular by means of the determining device 4.

In detail, the ascertaining of the type TW of the tool 2 comprises: selecting the type TW of the tool 2 from a set of different types TW, TW' of motor-driven tools 2.

In the exemplary embodiment shown, the user selects the type TW of the tool 2, in particular by activating an input device 6, in particular in the form of a touchscreen, in particular of the system 1, in particular the mobile apparatus 30, as shown in FIGS. 1 and 7.

In alternative exemplary embodiments, the ascertaining device and the tool, in particular the operating condition memory, can be designed to transmit, in particular in a wireless fashion, an identifier, in particular of the tool and/or the type of the tool, in particular a serial number, in order to ascertain the type of the tool, in particular can transmit said identifier. Additionally or alternatively, in alternative exemplary embodiments the system, in particular the ascertaining device, can have a camera, wherein the camera can be designed to record an image of the tool in order to ascertain the type of the tool, in particular can record an image.

Furthermore, the set of possible fault symptoms mFS can be selected by a user. The method comprises the steps of: d) selecting a fault symptom aFS from the determined set of possible fault symptoms mFS which can be selected by a user, in particular by means of the ascertaining device 3; e) determining a set of possible causes of faults mFU of the tool 2 and/or possible repair action instructions mRA and/or possible replacement parts mET for the tool 2 on the basis of the selected fault symptom aFS, in particular by means of the determining device 4; f) outputting the determined set of possible causes of faults mFU and/or possible repair action instructions mRA and/or possible replacement parts mET, in particular by means of the output device 5.

In the exemplary embodiment shown, the user selects the fault symptom aFS, in particular by activating the input device 6, as shown in FIGS. 1 and 7.

Moreover, the operating boundary condition RB has a meteorological characteristic variable MP, in particular an air pressure value LD, an air humidity value LF, a precipitation value NI and/or a temperature value TE, and/or an altitude value HE and/or a position PO of an operating environment 100 of the tool 2, as shown in FIGS. 1 and 7.

In detail, the step a) comprises: ascertaining an altitude value HE and/or a position PO of an operating environment 100 of the tool 2, and ascertaining the meteorological characteristic variable MP on the basis of the ascertained altitude HE and/or the ascertained position PO, in particular by means of the ascertaining device 3.

In the exemplary embodiment shown, the ascertaining device 3 has an altimeter for ascertaining the altitude HE and/or a position ascertaining device and/or a position determining device, in particular a satellite position-determining receiver, for ascertaining the position PO.

In alternative exemplary embodiments, the ascertaining device can have an air pressure meter for ascertaining the air pressure value, an air humidity meter for ascertaining the air moisture value, a precipitation meter for ascertaining the precipitation value and/or a thermometer for ascertaining the temperature value.

In the exemplary embodiment shown, the ascertaining device 3 is also designed to receive, in particular in a wireless fashion, the boundary operating condition RB, in particular the meteorological characteristic variable MP, on the basis of the ascertained altitude value HE and/or the ascertained position PO, in particular receives said variable.

In FIG. 1, the altitude HE is relatively high and therefore the air pressure LD is relatively low. Therefore, "tool not starting correctly or not starting at all" is determined and output as a set of possible fault symptoms mFS and/or "mixture controller, in particular carburettor, and/or spark plug defective" is determined and output as a set of possible causes of faults, and/or "repair mixture controller, in particular carburettor, and/or spark plug" is determined and output as a set of possible repair action instructions, and/or "mixture controller, in particular carburettor, and/or spark plug" is determined and output as a set of possible spare parts.

In another case, specifically if the altitude is relatively low and therefore the air pressure is relatively high, "tool switches off after starting or when idling" is determined and output as a set of possible fault symptoms, and/or "valve defective" is determined and output as a set of possible causes of faults, and/or "repair valve" is determined and output as a set of possible repair action instructions, and/or "valve" is determined and output as a set of possible spare parts.

In FIG. 5, the operating rotational speed frequency distribution nHV has a relatively low frequency in an idling-rotational speed range nLB, a relatively high frequency in a clutch-rotational speed range nKB, and a relatively low frequency in a working rotational speed range nAB. Therefore, "tool starts but does not work" is determined and output as a set of possible fault symptoms mFS, and/or "clutch defective" is determined and output as a set of possible causes of faults, and/or "repair clutch" is determined and output as a set of possible repair action instructions, and/or "clutch" is determined and output as a set of possible spare parts.

In FIG. 7, the position PO is an orange plantation. Therefore, a possible or probable material of a possible or probable workpiece which is to be processed by means of the tool 2 is very hard wood, in particular in contrast to a vineyard. Therefore, "blades of the branch shears no longer open or close completely" is determined and output as a set of possible fault symptoms mFS, and/or "gear mechanism, in particular ball screw, recirculating ball nut and/or pinion assembly defective" is determined and output as a set of possible causes of faults, and/or "repair gear mechanism, in particular ball screw, recirculating ball nut and/or pinion assembly" is determined and output as a set of possible repair action instructions, and/or "gear mechanism, in particular ball screw, recirculating ball nut and/or pinion assembly" is determined and output as a set of possible replacement parts.

In other words, the boundary operating condition can have a possible or probable material of a possible or probable workpiece to be processed by means of the tool. In particular, the step a) can comprise: ascertaining an altitude value and/or a position of an operating environment of the tool, and ascertaining the material on the basis of the ascertained altitude value and/or the ascertained position.

In addition, the determination comprises: selecting the set of possible fault symptoms mFS from a set of different fault symptoms FS, FS', FS", FS''', wherein the fault symptoms FS, FS', FS", FS''' are each assigned at least one boundary operating condition RB, RB' from a set of different boundary operating conditions RB, RB' and/or at least one operating condition BB, BB' from a set of different operating conditions BB, BB', in particular and at least one type TW, TW' of a tool 2 from a set of different types TW, TW' of tools 2, in particular by means of the determining device 4, as shown in FIGS. 3 and 6.

In addition, the determination comprises: selecting the set of possible causes of faults mFU and/or possible repair action instructions mRA and/or possible replacement parts mET from a set of different causes of faults FU, FU', FU", FU''' and/or different repair action instructions RA, RA', RA", RA''' and/or different replacement parts ET, ET', ET", ET''', wherein the causes of faults FU, FU', FU", FU''' and/or the repair action instructions RA, RA', RA", RA''' and/or the replacement parts ET, ET', ET", ET' are each assigned at least one boundary operating condition RB, RB' from a set of different boundary operating conditions RB, RB' and/or at least one operating condition BB, BB' from a set of different operating conditions BB, BB' and/or at least one fault symptom FS, FS' from a set of different fault symptoms FS, FS', in particular and at least one type TW, TW' of a tool 2 from a set of different types TW, TW' of tools 2, in particular by means of the determining device 4.

The method also comprises the steps of: ascertaining an actual fault symptom tFS and/or an actual cause of a fault tFU of the tool 2 and/or an actual repair action instruction tRA and/or an actual replacement part tET for the tool 2, as shown in FIG. 4; assigning the at least one boundary operating condition RB to the ascertained actual fault symptom tFS and/or the at least one boundary operating condition RB and/or assigning the, in particular selected and/or actual, fault symptom aFS, tFS to the ascertained actual cause of a fault tFU and/or to the ascertained actual repair action instruction tRA and/or to the ascertained actual replacement part tET for a subsequent execution of the method, in particular by means of the determining device 4.

In the exemplary embodiment shown, the repairer confirms or changes the actual fault symptom tFS and/or the actual cause of a fault tFU of the tool 2 and/or the actual repair action instruction tRA and/or the actual replacement part tET for the tool 2, in particular by activating an, in particular further, input device 6, in particular in the form of a touchscreen, in particular of the system 1, in particular of the stationary apparatus 35.

As is made clear by the exemplary embodiments which are shown and explained above, the invention makes available an advantageous method for providing automated assistance with repairing a motor-driven tool, and an advantageous system for providing automated assistance with repairing a motor-driven tool.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing automated assistance with repairing a motor-driven tool, the method comprising the steps of:
   a) ascertaining at least one boundary operating condition of the tool, wherein the tool has previously not functioned properly under this boundary operating condition;
   b) determining a set of possible fault symptoms of the tool on the basis of the ascertained boundary operating condition, wherein the set of possible fault symptoms are selectable by a user;
   c) outputting the determined set of possible fault symptoms,
   d) selecting a fault symptom from the determined set of possible fault symptoms which are selectable by the user;
   e) determining a set of possible causes of faults of the tool, possible repair action instructions, and/or possible replacement parts for the tool on the basis of the selected fault symptom; and
   f) outputting the determined set of possible causes of faults, possible repair action instructions, and/or possible replacement parts.

2. The method according to claim 1, wherein the tool does not have a fault sensor and/or does not have a fault memory.

3. The method according to claim 1, wherein the boundary operating condition comprises at least one of:
   a meteorological characteristic variable comprising at least one of: an air pressure value, an air humidity value, a precipitation value and/or a temperature value, or
   an altitude value, or
   a position of an operating environment of the tool.

4. The method according to claim 3, wherein the step a) comprises:
   ascertaining an altitude value and/or a position of an operating environment of the tool, and
   ascertaining the meteorological characteristic variable on the basis of the ascertained altitude value and/or the ascertained position.

5. The method according to claim 1, wherein
   the tool comprises an internal-combustion-engine drive system,
   the internal-combustion-engine drive system has previously not functioned properly under this boundary operating condition, and
   the set of possible fault symptoms, possible causes of faults of the internal-combustion-engine drive system, possible repair action instructions, and/or possible replacement parts is for the internal-combustion-engine drive system.

6. The method according to claim 5, wherein the internal-combustion-engine drive system comprises at least one of: a mixture controller, a spark plug, a valve or a clutch.

7. The method according to claim 6 wherein the mixture controller is a carburettor, or the valve is a fuel inlet valve.

8. The method according to claim 1, wherein
the tool is a saw, a pole-mounted pruner, a brush cutter, hedge shears, a hedge cutter, a blower, a leaf blower, branch shears, an angle grinder, a sweeping implement, a sweeping roller, a sweeping brush, a lawnmower, a verticutter, a grass trimmer, a chopper, a stone cutter, a high pressure cleaner or a spraying device and/or sprayer.

9. The method according to claim 1, further comprising the steps of:
ascertaining a type of the tool; and
determining the set of possible fault symptoms, possible causes of faults, possible repair action instructions, and/or possible replacement parts, on the basis of the ascertained type.

10. The method according to claim 9, wherein the ascertaining of the type of the tool comprises:
selecting the type of the tool from a set of different types of motor-driven tools.

11. The method according to claim 9,
wherein the determination comprises: selecting the set of possible fault symptoms from a set of different fault symptoms, wherein the different fault symptoms are each assigned at least one boundary operating condition from a set of different boundary operating conditions, and at least one type of a tool from a set of different types of tools, and/or
wherein the determination comprises: selecting the set of possible causes of faults, possible repair action instructions, and/or possible replacement parts from a set of different causes of faults, different repair action instructions, and/or different replacement parts, wherein the different causes of faults, the different repair action instructions, and/or the different replacement parts are each assigned at least one boundary operating condition from a set of different boundary operating conditions and/or at least one fault symptom from a set of different fault symptoms, and at least one type of a tool from a set of different types of tools.

12. The method according to claim 11, further comprising the steps of:
ascertaining an actual fault symptom, an actual cause of a fault of the tool, an actual repair action instruction, and/or an actual replacement part for the tool; and
assigning: (i) the at least one boundary operating condition to the actual ascertained fault symptom, and/or (ii) the at least one boundary operating condition and/or the fault symptom, to the actual ascertained cause of a fault, to the actual ascertained repair action instruction, and/or to the actual ascertained replacement part, for a subsequent execution of the method.

13. The method according to claim 1, further comprising the steps of:
ascertaining at least one operating condition, in the form of an operating rotational speed frequency distribution, of the tool, until the tool has not functioned properly;
determining the set of possible fault symptoms, possible causes of faults of the tool, possible repair action instructions, and/or possible replacement parts for the tool on the basis of the ascertained operating condition; and
outputting the determined set of possible fault symptoms, possible causes of faults, possible repair action instructions, and/or possible replacement parts.

14. A system for providing automated assistance with repairing a motor-driven tool, the system comprising:
an ascertaining device, wherein the ascertaining device is configured to ascertain at least one boundary operating condition of the tool, wherein the tool has previously not functioned properly under this boundary operating condition;
a determining device, wherein the determining device is configured to determine a set of possible fault symptoms of the tool on the basis of the ascertained boundary operating condition, the set of possible fault symptoms being selectable by a user;
an output device, wherein the output device is configured to output the determined set of possible fault symptoms;
a selection device, wherein the selection device is configured to select a fault symptom from the determined set of possible fault symptoms which are selectable by the user;
wherein the determining device is further configured to determine a set of possible causes of faults of the tool, possible repair action instructions, and/or possible replacement parts for the tool on the basis of the selected fault symptom; and
wherein the output device is further configured to output the determined set of possible causes of faults, possible repair action instructions, and/or possible replacement parts.

15. The system according to claim 14, further comprising the tool.

* * * * *